UNITED STATES PATENT OFFICE 2,089,602

CYCLIC AMMONIUM SALTS AND PROCESS OF MAKING SAME

Charles Gränacher, Basel, Switzerland, assignor to firm Society of Chemical Industry in Basle, Basel, Switzerland No Drawing. Application June 25, 1932, Serial No. 619,356. In Switzerland July 8, 1931

15 Claims. (Cl. 260—42)

The present invention relates to the manufacture of new cyclic ammonium salts which contain an acylated hydroxy-hydrocarbon radicle. It comprises the process of making these salts and the salts themselves which constitute valuable auxiliaries in the textile industry.

It has been found that ammonium salts of the general formula $$\text{halogen} \ldots X\text{—}R_1\text{—}O\text{—}\underset{\underset{O}{\|}}{C}\text{—}R_2$$

wherein $R_1$ represents an aliphatic hydrocarbon radicle containing at least two carbon atoms, X the nitrogen atom of a heterocyclic tertiary base which is capable of combining by addition with a halogen alkyl, the halogen atom being connected with the nitrogen atom X, and the nitrogen atom X and the oxygen atom —O— being connected with different carbon atoms, and wherein $R_2$ is an aliphatic or hydroaromatic radicle containing a least 7 carbon atoms, are obtained by causing a heterocyclic tertiary base and an acyl halide of the general formula $$R_2\text{—}\underset{\underset{O}{\|}}{C}\text{—halogen}$$

wherein $R_2$ has the significance defined above, to react in any desired sequence with a compound of the general formula $$\text{halogen} \ldots R_1\text{—OH}$$

wherein $R_1$ has the significance defined above, and wherein the OH-group and the halogen atom are connected with different carbon atoms.

The products thus obtained are colorless, soap-like masses which dissolve in water forming strongly foaming solutions. They are applicable in the textile industry for the production of emulsions or for other technical and therapeutic purposes.

Compounds of the above mentioned general formula $$\text{halogen} \ldots R_1\text{—OH}$$

are, for instance, ethylene, propylene, trimethylene, chlorhydrin, bromhydrin, iodohydrin, viz. compounds such as Cl—CH$_2$—CH$_2$—OH
Br—CH$_2$—CH$_2$—CH$_2$—OH
I—CH$_2$—CH—CH$_3$
　　　　|
　　　　OH
Br—CH$_2$—CH$_2$—CH$_2$—CH—CH$_3$
　　　　　　　　　　　|
　　　　　　　　　　　OH and so forth. Further, other analogously constituted compounds containing still more carbon atoms may be used.

Heterocyclic tertiary bases which may above all be used in the present invention are for instance compounds of the pyridine and pyrrolidine series, such as, for example, pyridine, the alkyl pyridines, the N-alkylpiperidines, the N-alkylpyrrolidines, nicotine, etc.

As halides there come into consideration those of the various aliphatic and hydroaromatic carboxylic acids containing at least 8 carbon atoms, such as, for example, the chlorides, bromides or iodides of acids, such as stearic acid, oleic acid, palmitic acid, lauric acid, myristic acid, naphthenic acid, etc.

The following examples illustrate the invention without, however, limiting the same, the parts being by weight:—

Example 1

200 parts of ethylene chlorhydrin and 220 parts of dry pyridine are heated together for 24 hours at 100° C., care being taken to exclude moisture. Into the hydroxyethyl-pyridinium-chloride thus produced 700 parts of stearic acid chloride are allowed to run gradually whilst stirring, the reaction mixture being maintained continuously at the temperature of the water bath. The reaction product gradually assumes an unctuous consistency; stirring is continued until a sample is soluble in water to a clear solution.

The product thus obtained of the formula

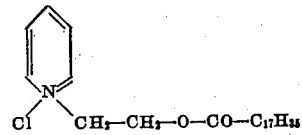

is an unctuous mass when hot and sets on cooling to a solid amorphous mass which is soluble in hot water to a clear solution. A solution of the product of 5 per cent. strength is still highly viscous and slimy when cold and has the appearance of mother-of-pearl.

The hydrogen chloride which is liberated during the reaction with stearic acid chloride escapes only partially during the reaction and a considerable quantity is retained in the unctuous mass; it is advantageously saturated by the subsequent addition of a pyridine base until the reaction is neutral.

Example 2

30 parts of hydroxyethylpyridinium chloride are heated together with 55 parts of oleic acid chloride on the water bath, while well stirring. After some time, reaction sets in with evolution of hydrogen chloride, spontaneous heating occurring. The mass becomes highly viscous. For completing the reaction, it is heated at 100° C., whilst stirring, until a sample is soluble in hot water to a clear solution.

The oleoyl-hydroxyethylpyridinium chloride thus formed of the formula

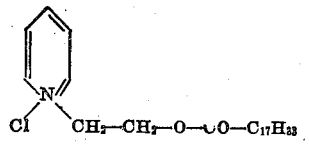

is an unctuous mass when cold, resembling a lubricating soap. Its dilute aqueous solutions are distinguished by a strong capacity for wetting.

*Example 3*

30 parts of hydroxyethylpyridinium chloride are heated together with 55 parts of linoleic acid chloride on the water bath, while well stirring. After some time, reaction sets in with evolution of hydrogen chloride, spontaneous heating occurring. The mass becomes highly viscous. For completing the reaction, it is heated at 100° C., whilst stirring, until a sample is soluble in hot water to a clear solution.

The linoleoyl-hydroxyethylpyridinium chloride thus formed of the formula

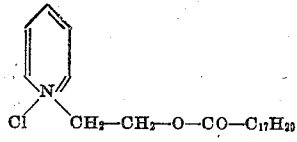

is an unctuous mass when cold, resembling a lubricating soap. Its dilute aqueous solutions are distinguished by a strong capacity for wetting.

*Example 4*

30 parts of hydroxyethylpyridinium chloride are heated together with 55 parts of a naphthenic acid chloride, made from a naphthenic acid having a saponification number of 180–200, in an oil bath to 120° C. while stirring. As soon as all the hydroxyethylpyridinium chloride has dissolved, the stirring is interrupted and the mixture heated further for 20 hours at 120–130° C.

The naphthenoyl - hydroxyethylpyridinium chloride thus produced of the formula

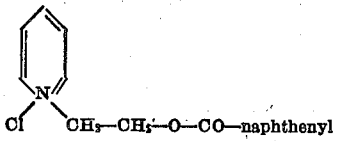

is a viscous syrup at room temperature and dissolves to a clear solution in a little hot water.

*Example 5*

10 parts of anhydrous nicotine are heated with 5 parts of ethylene chlorhydrin at 95–100° C. for 48 hours. The hydroxyethyl-nicotinium chloride thus produced is a highly viscous syrup which is soluble in water to a clear solution.

10 parts of hydroxyethyl-nicotinium chloride are mixed with 10 parts of oleic acid chloride in a suitable vessel provided with a stirrer and the mixture is heated whilst stirring at 100° C. until it has become a viscous homogeneous mass and a sample of the product dissolves in water to a clear solution. The oleoyl-hydroxyethyl-nicotinium chloride of the probable formula

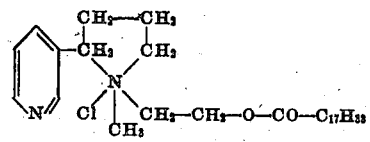

is a viscous sticky mass at ordinary temperature; an aqueous solution of the product foams strongly.

*Example 6*

11 parts of trimethylene bromohydrin are mixed with 7 parts of dry pyridine and the mixture is allowed to stand for 24 hours at ordinary temperature. The reaction mixture is then heated at 95–100° C. for a further 2 hours in order to complete the addition reaction. The β-hydroxypropyl-pyridinium bromide thus obtained is mixed with 20 parts of oleic acid chloride in a suitable vessel provided with a stirrer and the whole is stirred at the temperature of the water bath. The reaction mixture, which is at first non-homogeneous, changes suddenly into a clear unctuous mass which is soluble in water to a clear solution. It corresponds with the formula

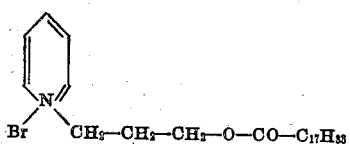

The hydrogen chloride which is liberated can be removed for the greater part by subjecting the mass to a reduced pressure, or it may advantageously be rendered harmless by neutralizing it by the addition of pyridine.

*Example 7*

10 parts of ethylene bromohydrin are mixed with 20 parts of oleic acid chloride. After a few minutes there is a lively evolution of hydrogen chloride;—the esterification is then completed by heating the reaction mixture for ½ hour on the water bath.

The oleic acid ethylene bromohydrin ester thus obtained is then mixed with 8 parts of dry pyridine and the mixture is heated on the water bath for 24 hours. The oleoyl hydroxyethylpyridinium bromide thus obtained of the formula

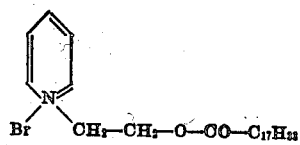

corresponds in its properties with the product of Example 2.

*Example 8*

10 parts of trimethylene bromohydrin are mixed with 20 parts of stearic acid chloride, whereby esterification occurs with evolution of hydrogen chloride and moderate evolution of heat. The product is heated for a further hour at the temperature of the water bath in order to complete the reaction.

6 parts of dry pyridine are then added to the stearic acid trimethylene bromohydrin ester thus obtained and the mixture is heated at 95–100° C. until a sample dissolves in water to a clear solution, which occurs after about 5-6 hours. The reaction product of the formula

forms when hot a semi-solid yellowish mass which is soluble in hot water to a solution which foams.

If in this example oleic acid chloride is used instead of stearic acid chloride there is obtained the product which is obtained according to Example 6.

Example 9

10 parts of trimethylene bromohydrin are mixed with 21 parts of oleic acid chloride. After a few moments hydrogen chloride is evolved. The reaction mixture is then heated on the water bath for a further ½ hour, in order to complete the esterification and the product is then freed as far as possible from hydrogen chloride by exposing it to a reduced pressure.

12 parts of nicotine are added to the oleic acid trimethylene bromohydrin ester thus obtained and the mixture is heated for 3 hours on the water bath whilst stirring from time to time. After this time there is formed a product, probably corresponding with the formula

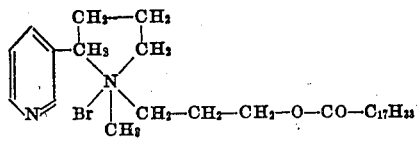

which is a viscous syrup; it is soluble in water to a clear solution which foams strongly.

Example 10

200 parts of ethylene chlorhydrin and 220 parts of a technical mixture of pyridine and its homologues are heated together for 24 hours at 100° C., care being taken to exclude moisture. Into the hydroxyethyl-pyridinium-chloride thus produced 700 parts of the chloride mixture of the fatty acid mixture obtained from coco fat are allowed to run gradually whilst stirring, the reaction mixture being maintained continuously at the temperature of the water bath. The reaction product gradually assumes an unctuous consistency; stirring is continued until a sample is soluble in water to a clear solution.

The product thus obtained is an unctuous mass when hot and sets on cooling to a solid amorphous mass which is soluble in hot water to a clear solution. A solution of the product of 5 per cent. strength is still highly viscous and slimy when cold and has the appearance of mother-of-pearl.

What I claim is:—

1. Process for the production of ammonium salts of the general formula

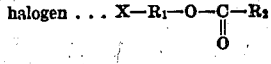

wherein $R_1$ represents an alkylene radicle containing at least 2 carbon atoms, X the nitrogen atom of a tertiary base of the pyridine series which is capable of combining by addition with halogen alkyls, the halogen atom being connected with the nitrogen atom X, and the nitrogen atom X and the oxygen atom —O— being connected with different carbon atoms, and wherein $R_2$ represents a group of radicles consisting of aliphatic and naphthenyl radicles containing at least 7 carbon atoms, consisting in heating in the neighborhood of 100° C. a compound of the general formula

wherein $R_1$ also has the significance defined above, and wherein the OH-group and the halogen atom are connected with different carbon atoms, successively but in any desired sequence with a tertiary base of the pyridine series and an acyl halide of the general formula

wherein $R_2$ has the significance defined above.

2. Process for the production of ammonium salts of the general formula

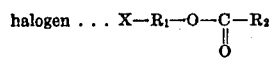

wherein $R_1$ represents an alkylene radicle containing at least 2 carbon atoms, X the nitrogen atom of a tertiary base of the pyridine series which is capable of combining by addition with halogen alkyls, the halogen atom being connected with the nitrogen atom X, and the nitrogen atom X and the oxygen atom —O— being connected with different carbon atoms, and wherein $R_2$ represents a group of radicles consisting of aliphatic and naphthenyl radicles containing at least 7 carbon atoms, consisting in heating in the neighborhood of 100° C. a compound of the general formula

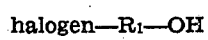

wherein $R_1$ also has the significance defined above, and wherein the OH-group and the halogen atom are connected with different carbon atoms first with a tertiary base of the pyridine series and subsequently with an acyl halide of the general formula

wherein $R_2$ has the significance defined above.

3. Process for the production of ammonium salts of the general formula

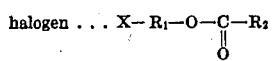

wherein $R_1$ represents an alkylene radicle containing at least 2 carbon atoms, X the nitrogen atom of a tertiary base of the pyridine series which is capable of combining by addition with halogen alkyls, the halogen atom being connected with the nitrogen atom X, and the nitrogen atom X and the oxygen atom —O— being connected with different carbon atoms, and wherein $R_2$ represents an aliphatic radicle containing at least 7 carbon atoms, consisting in heating in the neighborhood of 100° C. a compound of the general formula

wherein $R_1$ also has the significance defined above, and wherein the OH-group and the halogen atom are connected with different carbon atoms, successively but in any desired sequence with a tertiary base of the pyridine series and an acyl halide of the general formula

wherein $R_2$ has the significance defined above.

4. Process for the production of ammonium salts of the general formula $$\text{halogen} \ldots X-R_1-O-C(=O)-R_2$$

wherein $R_1$ represents an alkylene radicle containing at least 2 carbon atoms, X the nitrogen atom of a tertiary base of the pyridine series which is capable of combining by addition with halogen alkyls, the halogen atom being connected with the nitrogen atom X, and the nitrogen atom X and the oxygen atom —O— being connected with different carbon atoms, and wherein $R_2$ represents an aliphatic radicle containing at least 7 carbon atoms, consisting in heating in the neighborhood of 100° C. a compound of the general formula $$\text{halogen}-R_1-OH,$$

wherein $R_1$ also has the significance defined above, and wherein the OH-group and the halogen atom are connected with different carbon atoms, first with a tertiary base of the pyridine series and subsequently with an acyl halide of the general formula $$R_2-CO-\text{halogen},$$

wherein $R_2$ has the significance defined above.

5. Process for the production of ammonium salts of the general formula $$\text{halogen} \ldots X-CH_2-CH_2-O-C(=O)-R_2$$

wherein X represents the nitrogen atom of a pyridine base which is capable of combining by addition with halogen alkyls, the halogen atom being connected with the nitrogen atom X, and wherein $R_2$ represents an aliphatic radicle containing at least 7 carbon atoms, consisting in heating in the neighborhood of 100° C. a compound of the formula $$\text{halogen}-CH_2-CH_2-OH$$

successively but in any desired sequence with a pyridine base and an acyl halide of the general formula $$R_2-CO-\text{halogen},$$

wherein $R_2$ has the significance defined above.

6. Process for the production of ammonium salts of the general formula $$\text{halogen} \ldots X-CH_2-CH_2-O-C(=O)-R_2$$

wherein X represents the nitrogen atom of a pyridine base which is capable of combining by addition with halogen alkyls, the halogen atom being connected with the nitrogen atom X, and wherein $R_2$ represents an aliphatic radicle containing at least 7 carbon atoms, consisting in heating in the neighborhood of 100° C. a compound of the formula $$\text{halogen}-CH_2-CH_2-OH$$

first with a pyridine base and subsequently with an acyl halide of the general formula $$R_2-CO-\text{halogen},$$

wherein $R_2$ has the significance defined above.

7. Process for the production of a mixture of ammonium salts of the general formula $$\text{halogen} \ldots X-CH_2-CH_2-O-C(=O)-R$$

wherein X represents the nitrogen atom of one of a mixture of pyridine bases which are capable of combining by addition with halogen alkyls, the halogen atom being connected with the nitrogen atoms X, and wherein $$-C(=O)-R$$

stands for the radicle of one of a mixture of fatty acids obtained from natural fats consisting in heating in the neighborhood of 100° C. a compound of the formula $$\text{halogen}-CH_2-CH_2-OH$$

successively but in any desired sequence with a technical mixture of pyridine bases and a mixture of fatty acid chlorides obtained from natural fats.

8. Process for the production of a mixture of ammonium salts of the general formula $$\text{halogen} \ldots X-CH_2-CH_2-O-C(=O)-R$$

wherein X represents the nitrogen atom of one of a mixture of pyridine bases which are capable of combining by addition with halogen alkyls, the halogen atoms being connected with the nitrogen atoms X, and wherein $$-C(=O)-R$$

stands for the radicle of one of a mixture of fatty acids obtained from natural fats consisting in heating in the neighborhood of 100° C. a compound of the formula $$\text{halogen}-CH_2-CH_2-OH$$

first with a technical mixture of pyridine bases and subsequently with a mixture of fatty acid chlorides obtained from natural fats.

9. The ammonium salts of the general formula $$\text{halogen} \ldots X-R_1-O-C(=O)-R_2$$

wherein $R_1$ represents an alkylene radicle containing at least 2 carbon atoms, X the nitrogen atom of a tertiary base of the pyridine series which is capable of combining by addition with halogen alkyls, the halogen atom being connected with the nitrogen atom X, and the nitrogen atom X and the oxygen atom —O— being connected with different carbon atoms, and wherein $R_2$ represents a group of radicles consisting of aliphatic and naphthenyl radicles containing at least 7 carbon atoms, which products constitute colorless soap-like masses which dissolve in water with formation of strongly foaming solutions.

10. The ammonium salts of the general formula $$\text{halogen} \ldots X-R_1-O-C(=O)-R_2$$

wherein $R_1$ represents an alkylene radicle containing at least 2 carbon atoms, X the nitrogen atom of a teritary base of the pyridine series which is capable of combining by addition with halogen alkyls, the halogen atom being connected with the nitrogen atom X, and the nitrogen atom X and the oxygen atom —O— being connected with different carbon atoms, and wherein $R_2$ represents an aliphatic radicle containing at least 7 carbon atoms, which products constitute colorless soap-like masses which dissolve in water with formation of strongly foaming solutions.

11. The ammonium salts of the general formula $$\text{halogen} \ldots X-CH_2-CH_2-O-C(=O)-R_2$$

wherein X represents the nitrogen atom of a tertiary base of the pyridine series which is capable of combining by addition with halogen alkyls, the halogen atom being connected with the nitrogen atom X, and wherein R₂ represents an aliphatic radicle containing at least 7 carbon atoms, which products constitute colorless soap-like masses which dissolve in water with formation of strongly foaming solutions.

12. The ammonium salt of the formula

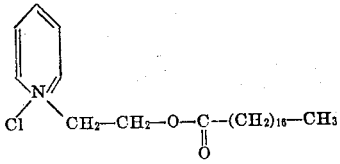

which product constitutes a colorless soap-like mass which dissolves in water with formation of a strongly foaming solution.

13. The ammonium salt of the formula

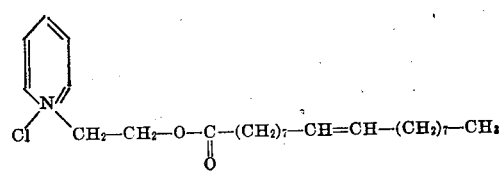

which product constitutes a colorless soap-like mass which dissolves in water with formation of strongly foaming solution.

14. The ammonium salt of the formula

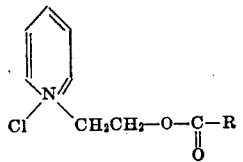

wherein

is a naphthenic acid radicle having a saponification number of 180 to 200.

15. Palmityl-oxy-ethyl pyridinium halide having the formula,

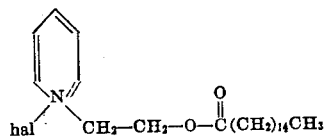

CHARLES GRÄNACHER.